(12) United States Patent
Nix

(10) Patent No.: US 8,360,052 B2
(45) Date of Patent: Jan. 29, 2013

(54) HALF PARABOLIC DISH REFLECTOR WITH PLANAR REFLECTOR SOLAR SMELTER

(76) Inventor: Martin E Nix, Seattle, WA (US)

( * ) Notice: Subject to any disclaimer, the term of this patent is extended or adjusted under 35 U.S.C. 154(b) by 1121 days.

(21) Appl. No.: 12/286,583

(22) Filed: Sep. 30, 2008

(65) Prior Publication Data

US 2010/0078012 A1    Apr. 1, 2010

(51) Int. Cl.
*F24J 2/12* (2006.01)
*F24J 2/18* (2006.01)

(52) U.S. Cl. ........ 126/608; 126/680; 126/681; 126/685; 126/686; 126/688; 126/689; 126/690; 126/696

(58) Field of Classification Search .................. 126/617, 126/618, 619, 620, 634, 656, 680, 681, 685, 126/686, 688, 689, 690, 696, 400, 608
See application file for complete search history.

(56) References Cited

U.S. PATENT DOCUMENTS

| | | | | |
|---|---|---|---|---|
| 549,765 A * | 11/1895 | Calver | | 48/89 |
| 608,755 A * | 8/1898 | Cottle | | 136/206 |
| 683,088 A * | 9/1901 | Wideen | | 126/603 |
| 2,277,311 A * | 3/1942 | Freeman | | 126/640 |
| 3,118,437 A * | 1/1964 | Hunt | | 126/600 |
| 3,407,122 A * | 10/1968 | Dickinson, III | | 202/83 |
| 3,815,574 A * | 6/1974 | Gaydos, Jr. | | 126/620 |
| 3,884,217 A * | 5/1975 | Wartes | | 126/571 |
| 3,923,039 A * | 12/1975 | Falbel | | 126/600 |
| 3,991,740 A | 11/1976 | Rabl | | |
| 4,000,733 A | 1/1977 | Pauly | | |
| 4,088,116 A * | 5/1978 | Pastor | | 126/677 |
| 4,235,224 A * | 11/1980 | Yarwood et al. | | 126/684 |
| 4,237,864 A | 12/1980 | Kravitz | | |
| 4,246,888 A * | 1/1981 | Jarzenbeck, Sr. | | 126/620 |
| 4,265,224 A * | 5/1981 | Meyer | | 126/572 |
| 4,280,480 A * | 7/1981 | Raposo | | 126/620 |
| 4,280,482 A * | 7/1981 | Nilsson, Sr. | | 126/618 |
| 4,311,011 A * | 1/1982 | Lewis | | 60/641.15 |
| 4,317,031 A * | 2/1982 | Findell | | 250/203.4 |
| 4,356,812 A * | 11/1982 | Haven | | 126/572 |
| 4,384,569 A * | 5/1983 | Clearman et al. | | 126/617 |
| 4,397,152 A * | 8/1983 | Smith | | 60/641.15 |
| 4,422,434 A * | 12/1983 | Statz et al. | | 126/634 |
| 4,422,445 A * | 12/1983 | Pelley | | 126/625 |
| 4,432,344 A * | 2/1984 | Bennington et al. | | 126/680 |
| 4,455,153 A * | 6/1984 | Jakahi | | 48/62 R |
| 4,483,324 A * | 11/1984 | Fromm | | 126/572 |
| 4,582,590 A | 4/1986 | Qader | | |
| 4,611,857 A | 9/1986 | Watkins | | |
| 4,706,651 A * | 11/1987 | Yudow | | 126/681 |
| 4,881,372 A * | 11/1989 | Naito | | 60/521 |
| 4,896,507 A * | 1/1990 | Hosford | | 60/641.8 |

(Continued)

FOREIGN PATENT DOCUMENTS

DE    3522404 A1 *  1/1987

*Primary Examiner* — Carl Price

(57) ABSTRACT

Melting metals using the sun's energy is not new, but is new is making the technology ergonomic, and easy to use. Invented is a half-circular-planar-reflector with a cut-a-way-triangle, hinged and attached a half-shell-parabolic-reflector. When the sun is overhead, the sun's energy reflects off the flat half-circular-planar-reflector to a half-shell-parabolic-dish-reflector, which redirects the sun's energy to a crucible for smelting metals, which is also the focus of the sun's energy. The entire assembly rotates on top of a turntable, which can be steel wheel, floating on compressed air, bicycle wheels, or other suitable methods. The entire assembly rotates about a crucible located at the focal of the sun's energy. A smaller version of the smelter can be used for solar cooking.

1 Claim, 4 Drawing Sheets

U.S. PATENT DOCUMENTS

Figure 1:
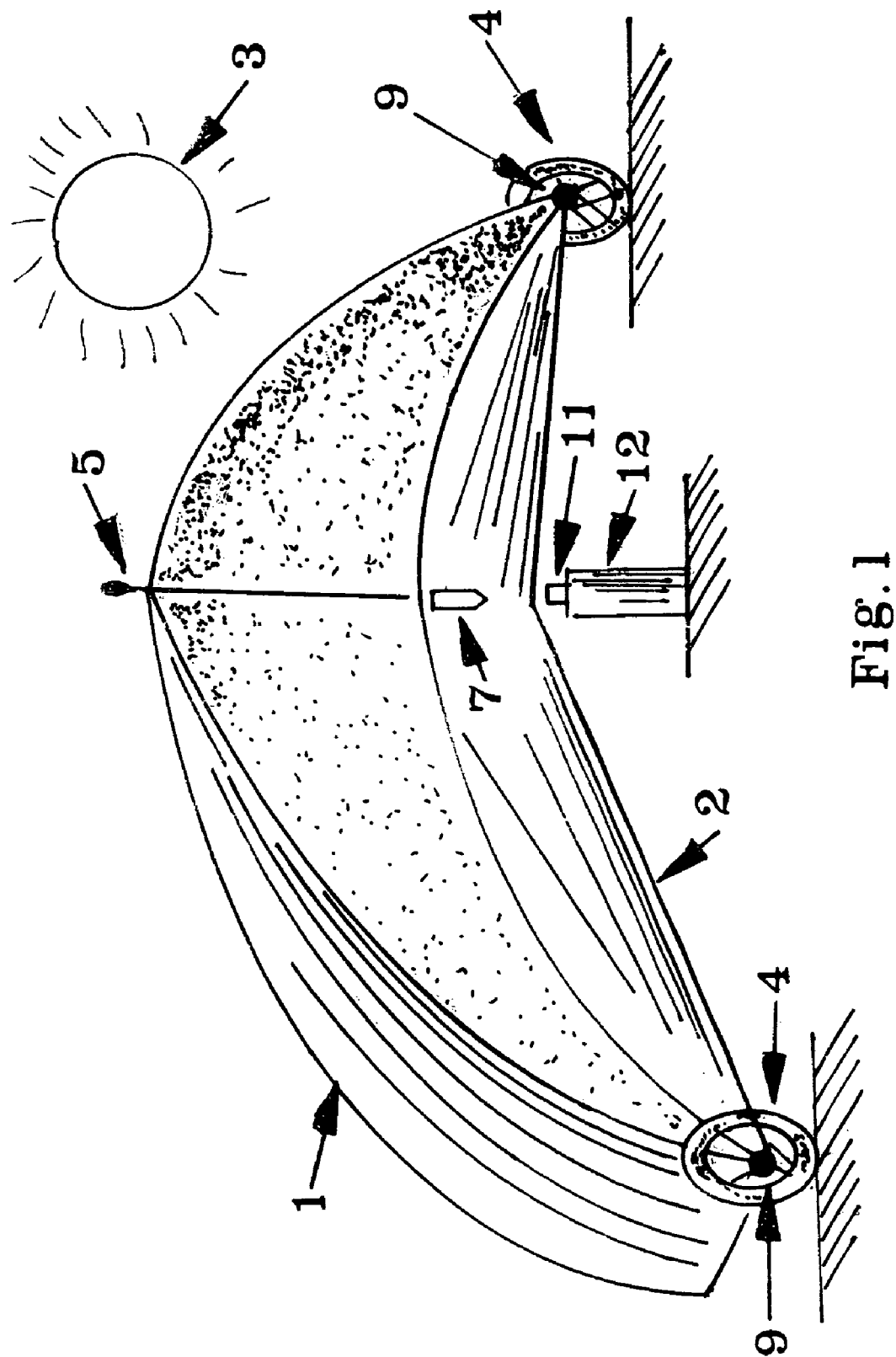

| | | | |
|---|---|---|---|
| 5,005,958 A | 4/1991 | Winston | |
| 5,058,675 A * | 10/1991 | Travis | 166/272.3 |
| 5,090,399 A | 2/1992 | Tarcici | |
| 5,138,832 A | 8/1992 | Pande | |
| 5,203,318 A | 4/1993 | Chauvet | |
| 5,454,853 A | 10/1995 | Edelson | |
| 5,556,517 A | 9/1996 | Smalley | |
| 5,882,434 A | 3/1999 | Horne | |
| 6,178,707 B1 * | 1/2001 | Bengtson | 52/200 |
| 6,606,988 B2 | 8/2003 | Clark | |
| 6,811,271 B2 * | 11/2004 | Hayakawa et al. | 359/846 |
| 6,936,760 B2 | 8/2005 | Rogers | |
| 6,953,038 B1 * | 10/2005 | Nohrig | 126/694 |
| 7,140,181 B1 | 11/2006 | Jensen | |
| 7,299,633 B2 | 11/2007 | Murphy | |
| 7,337,843 B2 * | 3/2008 | Mecham et al. | 166/302 |
| 7,975,685 B2 * | 7/2011 | Zhao | 126/683 |
| 2007/0221209 A1 * | 9/2007 | Neubauer et al. | 126/692 |
| 2010/0078012 A1 * | 4/2010 | Nix | 126/686 |
| 2012/0037152 A9 * | 2/2012 | Nix | 126/686 |

\* cited by examiner

HALF PARABOLIC DISH REFLECTOR WITH PLANAR REFLECTOR SOLAR SMELTER

FIELD OF INVENTION

Invented is a half-shell-parabolic-reflector with a frontal half-circular-planar-reflector with a cut-a-way-triangle for access that can focus the sun's energy.

PRIOR ART

Melting metals with sunlight has been known art and science for decades.

Cottle (U.S. Pat. No. 608,755, issued Aug. 9, 1898) illustrates the early art using a curved reflector to direct sunlight into a thermal storage receiver. The curved reflector operates on a circular track.

Rabl (U.S. Pat. No. 3,991,740, issued Nov. 16, 1976) illustrates a curved reflector, shaped like a sea shell, that reflects light to a focus.

Pauly (U.S. Pat. No. 4,000,733, issued Jan. 4, 1977) illustrates a solar furnace, which vaporizes carbon for production of hydrogen.

Kravitz (U.S. Pat. No. 4,237,864, issued Dec. 9, 1980) illustrates a focusing solar collector in a parabolic shape using an adjustable drape angle.

Qader (U.S. Pat. No. 4,582,590, issued Apr. 15, 1986) illustrates how focused solar energy can process shale into oil using pyrolysis.

Watkins (U.S. Pat. No. 4,611,857, issued Sep. 16, 1986) illustrates the use of the sun for cutting, shaping and polishing of materials.

Winston, et.al. (U.S. Pat. No. 5,005,958, issued Apr. 9, 1991) illustrates how high flux energy can be used to focus the sun's energy to high resolution.

Tarcici (U.S. Pat. No. 5,090,399, issued Feb. 25, 1992) illustrates a foldable parabolic reflector that can be used to cook food.

Pande (U.S. Pat. No. 5,138,832, issued Aug. 18, 1992) illustrates how solar thermal energy can be used to create rocket thrust.

Chauvet (U.S. Pat. No. 5,203,318, issued Apr. 20, 1993) illustrates a sun tracking solar concentrator.

Edelson (U.S. Pat. No. 5,454,853, issued Oct. 3, 1995) illustrates a method of production of steel, using solar energy and other renewable as energy input.

Smalley (U.S. Pat. No. 5,556,517, issued Sep. 17, 1996) illustrates the use of solar energy to make high temperatures to make Fullerenes.

Horne (U.S. Pat. No. 5,882,434, issued Mar. 16, 1999) illustrates a parabolic concentrator that focuses an offset configuration.

Clark (U.S. Pat. No. 6,606,988, issued Aug. 19, 2003) illustrates a solar oven using multiple zones for concentrators.

Rogers (U.S. Pat. No. 6,936,760, issued Aug. 30, 2005) illustrates a space based solar system.

Jensen (U.S. Pat. No. 7,140,181, issued Nov. 28, 2006) illustrates a solar processing reactor for gases.

Murphy (U.S. Pat. No. 7,299,633, issued Nov. 27, 2007) illustrates a solar power system for using molten salt for thermal storage.

Mechan (U.S. Pat. No. 7,337,843, issued Mar. 4, 2008) illustrate the use of fiber optics for converting oil shale, oil sand, asphaltic crude oil, and other underground carbon for liquefaction.

All of the above art illustrate that solar energy can be used for high temperature applications, including processing of chemicals. The invented device improves upon this art.

DESCRIPTION OF THE INVENTED DEVICE

Use of solar energy for mankind's benefit has been a known technology since the beginning. It is a commonly known fact that a parabolic shape can focus intense solar energy unto a small area, much like a magnifying glass pointed at the sun. When focused in sufficient quantity, the intense energy can be used to melt metals, process chemicals or cook food. The invented device improves upon the art of focusing the sun's energy so that it can produce high temperatures for chemical processing.

The invented device consist of a half-shell-parabolic-reflector that is reflective. A half-circular-planar-reflector is adjustable and tiltable so as to reflect the sun's energy into the interior of the half-shell-parabolic-reflector. The half-shell-parabolic-reflector then redirects the sun's energy to a focus located at ground level. At the focal can be a crucible, that is placed on a pedestal, so as to process materials, like metal, at high temperatures. The entire assembly rotates about a vertical axis formed at the crucible-and-focal, rotating on a turntable (like) system. Illustrated are bicycle wheels, however, the turntable can be floating on water, floating on air, or be mounted on railroad tracks, or concrete monorail tracks.

Attached and hinged to the half-shell-parabolic-reflector is a half-circular-planar-reflector that is tiltable using a system of pulleys and weights. The half-circular-planar-reflector can be adjusted so as to direct sunlight inwards towards the half-shell-parabolic-reflector.

The half-circular-planar-reflector has a cut-a-way-triangle that allows access to the crucible-and-focal and pedestal. The net result is a easy to use, ergonomic method of smelting metals, processing chemicals or to cook food.

DETAILED DESCRIPTION OF THE INVENTED DEVICE

FIG. 1 shows a perspective of the invented device. Shown is a half-shell-parabolic-reflector (1) that has an interior reflective surface. A half-circular-planar-reflector (2) is tiltable and adjustable according to the location of the sun's energy (3). The half-circular-parabolic-reflector (2) is hinged (9) to the half-shell-parabolic-reflector (1). The half-circular-planar-reflector (2) is adjusted in height by a pulley-and-cable assembly (5). The half-circular-planar-reflector (2) has a counter-weight-ballast located centrally and at the top of the half-shell-planar-reflector (2). The sun's energy (3) focuses onto a crucible-and-focal (11) located at the focal of the sun's energy (3) and on top of the pedestal (12). The crucible-and-focal (11) can alternatively be buried in the ground. The half-circular-planar-reflector (2), half-shell-parabolic-reflector (1), and cut-a-way-triangle rotate around a vertical and central axis, formed by a vertical axis located at the crucible (11)-and-focal (11).

Figure 2:
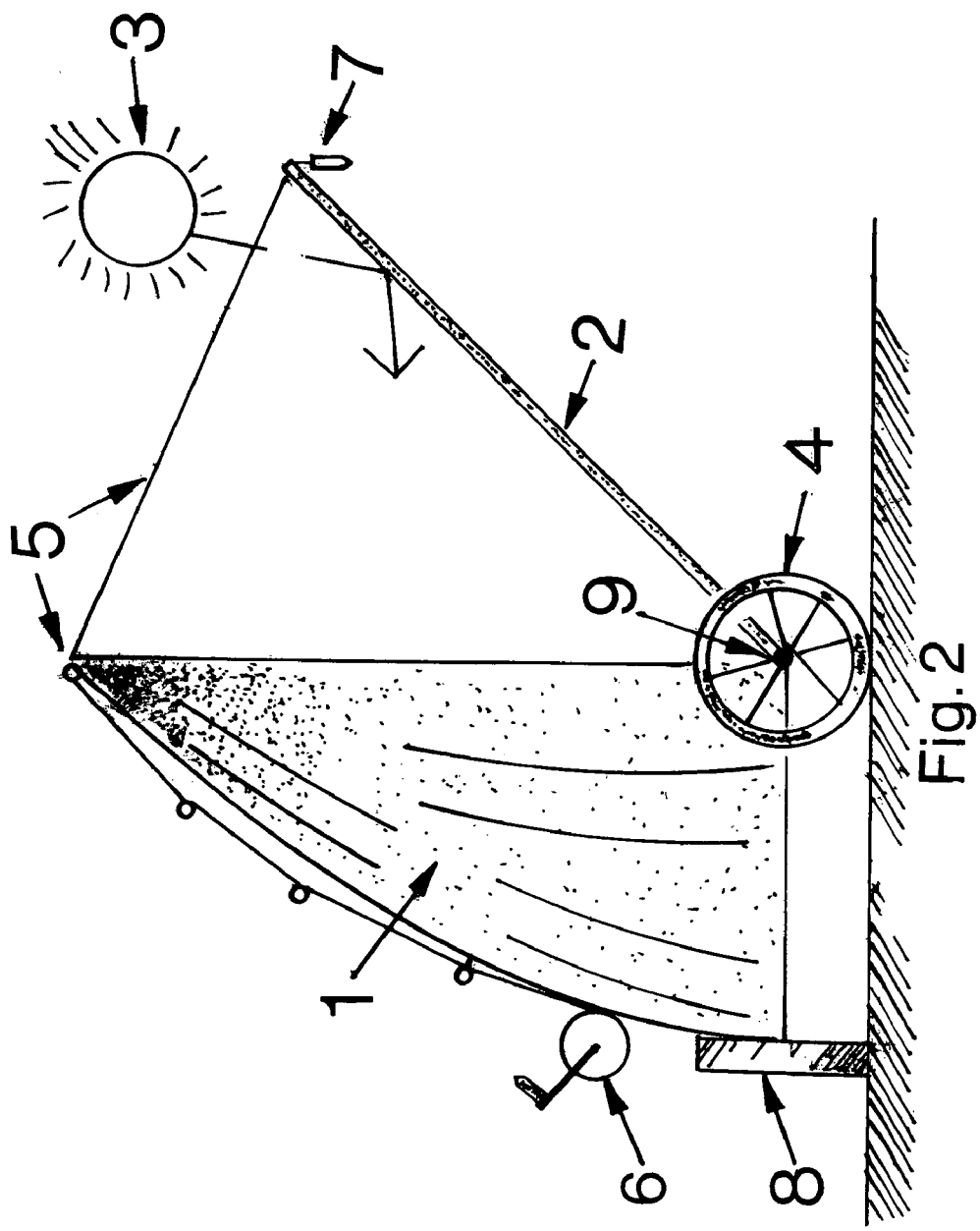

FIG. 2 shows a side view of the invented device. Shown is a half-shell-parabolic-reflector (1) that has an interior reflective surface. A half-circular-planar-reflector (2) is tiltable and adjustable according to the location of the sun's energy (3). The half-circular-planar-reflector (2) is hinged (9) to the half-shell-parabolic-reflector (1). The hinge is located at the base of the half-shell-parabolic-reflector (1) and the base of the half-circular-planar-reflector (2), where both intersect. The half-circular-planar-reflector (2) has a counter-weight-ballast (7) located centrally and at the top of the half-circular-planarreflector (2). Shown also is a wrench (6) for adjusting the pulley-and-cable assembly (5). Shown also are bicycle wheels (4) on the base of the half-shell-parabolic-reflector (1), and another bicycle wheel (8) on the backside base of the half-shell-parabolic-reflector (1). The half-circular-planar-reflector (2), half-shell-parabolic-reflector (1), and cut-a-way-triangle (10) rotates around a vertical and centrally located axis formed by the crucible-and-focal (11), tracking the sun's energy (3). Reflection is shown by straight arrows.

Figure 3:
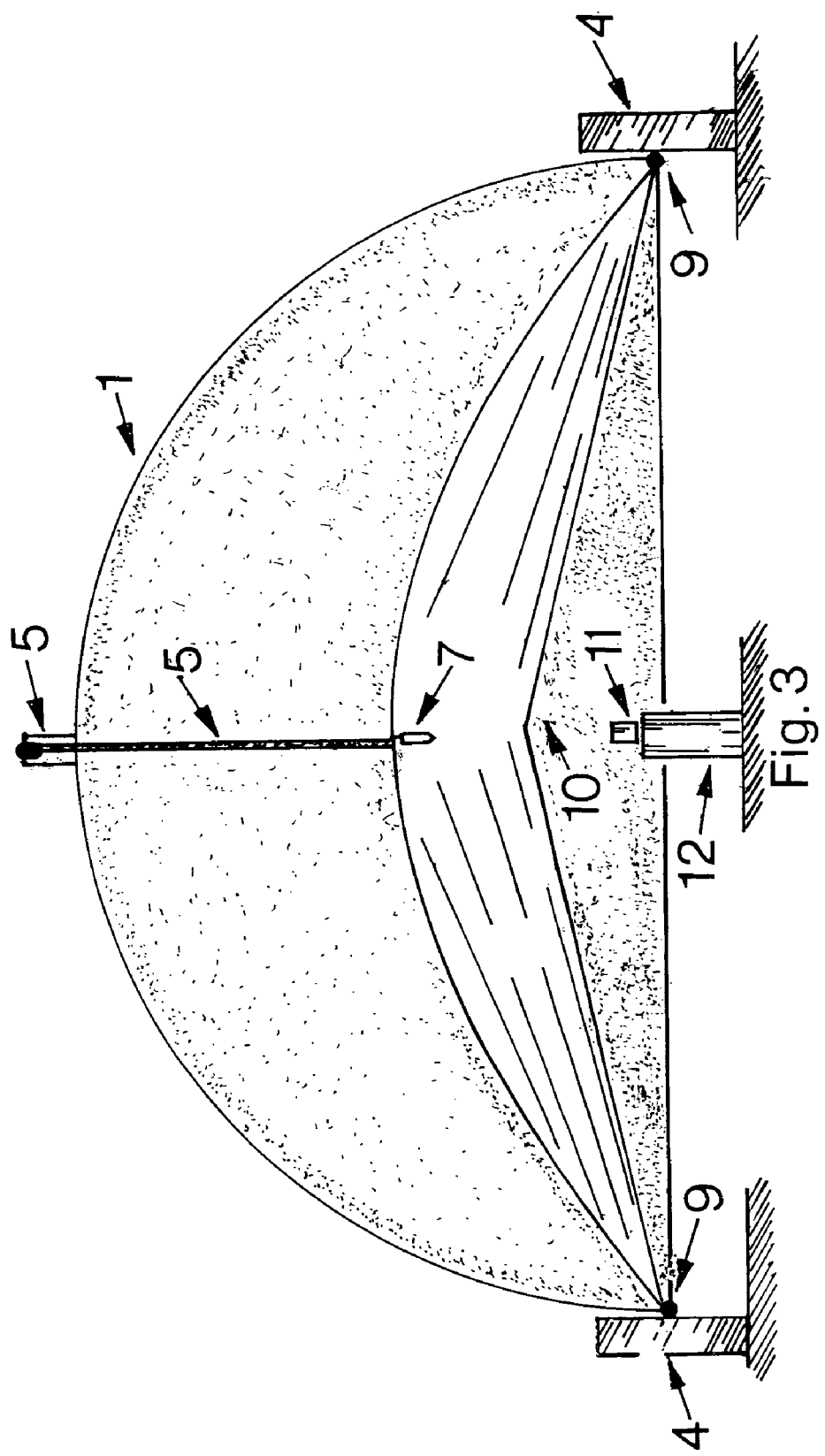

FIG. 3 shows a frontal view of the invented device. A half-shell-parabolic-reflector (1) reflects the sun's energy to a focus (11), where located is a crucible (11) on top of a pedestal (12). The focus (11) can alternatively be ground level, thus allowing the crucible (11) to be partially buried in the ground. Attached and hinged to the half-shell-parabolic-reflector (1) is a half-circular-planar-reflector (2) that is held in place by a pulley-and-cable (5) assembly. A counter-weight-ballast (7) helps to keep the half-circular-planar-reflector stable (2), even in wind. Centrally located inside the half-circular-planar-reflector (2) is a triangular cut-a-way-triangle (10) that allows access to the focal (11) and crucible (11) located on the pedestal (12). The cut-a-way-triangle (10) is located in the lower portion of the half-circle-planar-reflector. The hinge (9) allows the half-circular-planar-reflector (2) to tilt to the desired angle. Bicycle wheels (4,8) attached to the half-shell-parabolic-reflector (1) allow the invented device (1,2,10) to rotate like a turntable, rotating about a vertical axis formed at the crucible-and-focal (11). The bicycle wheels (4,8) are attached to the base of the half-shell-parabolic-reflector. Bicycle wheels (4,8) are not necessarily the only method of rotating the entire invented device (1,2,10). The invented device (1,2,10) can be rotated on a turntable floating on water, floating on air, or on a concrete monorail track or steel rail track, or other methods.

Figure 4:
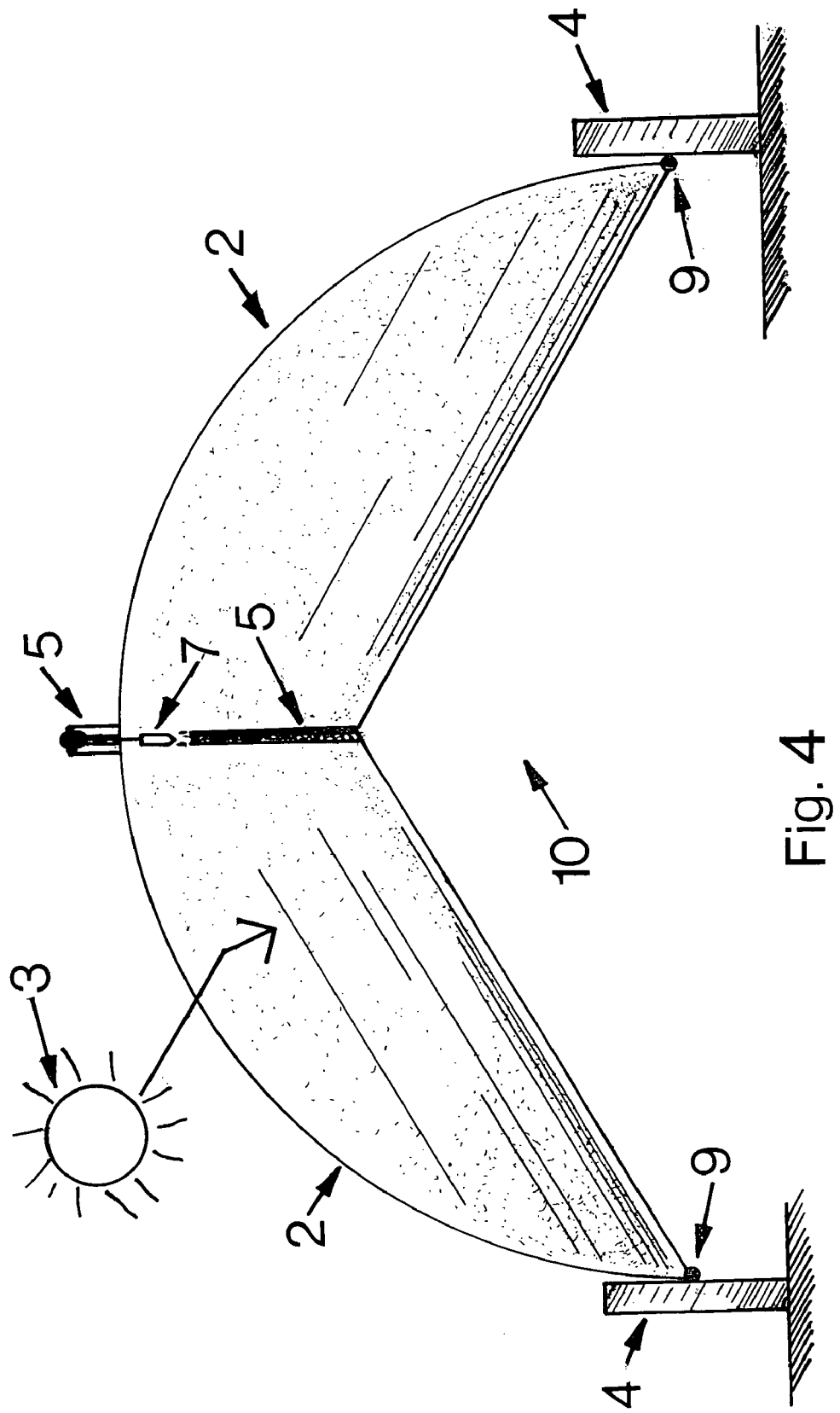

FIG. 4 shows the half-circular-planar-reflector (2). At top is a pulley-and-cable (5) assembly with a counter-weight-ballast (7). The half-circular-planar-reflector (2) is hinged (9) to the half-shell-parabolic-reflector (1). The hinge (9) is jointly attached to the base of the half-shell-parabolic-reflector (1) and the base of the half-circular-planar-reflector (2), where both intersect. The sun's energy (3) reflects off the half-shell-planar-reflector (2). The sun's energy (3) reflects off the half-circular-planar-reflector (2) into the half-shell-parabolic-reflector (1) so as to focus the sun's energy onto metals to be smelted, or chemicals to be processed, to cook food. Shown also is a cut-a-way-triangle (10) that allows access to the smelting and cooking area. Shown also are the bicycle wheels (4,8) that are used to rotate the entire invented device (1,2,10) to track the sun's energy.

I claim:
1. A radiant solar energy collector
a reflector assembly
and
crucible comprising,
a flat planar reflector member having a reflective surface on one side and formed generally in the shape of a half circle defining a curved peripheral edge having a constant radius of curvature;
the curved peripheral edge terminates at a first end of the curved peripheral edge which defines a first end location of the flat planar reflector member;
the curved peripheral edge also terminates at a second end of the curved peripheral edge which defines a second end location of the flat planar reflector member;
a first straight peripheral edge section of flat planar reflector extends from the first end of the curved peripheral edge;
a second straight peripheral edge section of flat planar reflector extends from the second end of the curved peripheral edge;
the first straight peripheral edge section and the second straight peripheral edge section each have a length greater than on half a distance measured between the first end location and the second end location of the flat planar reflector member;
the first straight peripheral edge section and the second straight peripheral edge section are of equal length and intersect at a point lying within a plane defined by the flat planar reflector member to thereby define a cut-a-way-triangle area is formed in the flat planar reflector member; and
a parabolic reflector formed as one half of a round parabolic dish and defining an interior concave surface on one side and an exterior convex surface on a side opposite the interior concave surface and wherein the interior concave surface is reflective;
the reflective surface of the parabolic reflector directs solar radiation energy onto a focal point;
said parabolic reflector includes a parabolic reflector curved peripheral edge and a parabolic reflector straight peripheral edge;
said parabolic reflector curved peripheral edge and said parabolic reflector straight peripheral edge intersect with each other at a first point defining a first end location of the parabolic reflector and at a second point defining a second end location of the parabolic reflector; and
wherein the reflective surface of the flat reflector is oriented in a direction facing the reflective surface of the parabolic reflector; and
a first hinge is arranged to hingely attach the a first end location of the flat planar reflector member to the first end location of the parabolic reflector; and
a second hinge is arranged to hingely attach the a second end location of the flat planar reflector member to the second end location of the parabolic reflector; and
said crucible is located at the focal point of the parabolic reflector; and
means to support and rotate the reflector assembly about an axis oriented perpendicular to a horizontal line extending between the first and second hinges and vertically through the crucible and focal point; and
wherein the cut-a-way triangle area of the flat reflector is arranged to provide access to said crucible and focal point.

* * * * *